United States Patent
Johnstone

[11] 3,890,501
[45] June 17, 1975

[54] NEUTRON LOGGING RELIABILITY TECHNIQUES AND APPARATUS

[75] Inventor: Charles Wilkin Johnstone, Houston, Tex.

[73] Assignee: Schlumberger Technology Corporation, New York, N.Y.

[22] Filed: May 1, 1973

[21] Appl. No.: 356,150

[52] U.S. Cl. ............... 250/265; 250/266; 250/270
[51] Int. Cl. ......................................... G01v 5/00
[58] Field of Search .................... 250/265, 266, 270

[56] References Cited
UNITED STATES PATENTS

| | | | |
|---|---|---|---|
| 3,061,725 | 10/1962 | Green | 250/265 |
| 3,373,280 | 3/1968 | Mills, Jr. | 250/262 |
| 3,483,376 | 12/1969 | Locke et al. | 250/265 X |
| 3,509,342 | 4/1970 | Dewan | 250/264 |

Primary Examiner—Archie R. Borchelt
Attorney, Agent, or Firm—Brumbaugh, Graves, Donohue & Raymond

[57] ABSTRACT

Apparatus and methods for verifying the validity of data derived at least in part by neutron logging of earth formations, and, where indicated, for affording neutron diffusion-corrected values of such data, are disclosed. In the illustrative embodiments described, an earth formation is irradiated with discrete pulses of high-energy neutrons, and a neutron characteristic of the formation is measured at a first location spaced from the neutron source by observing the neutron population decay at that location during a time period between pulses that is a function of a like earlier measurement of the neutron characteristic. The neutron population decay at a second location in the formation is also measured during a time period that is functionally related to a measured value of the neutron characteristic, conveniently the earlier measured value at the first location. An indication is then derived in response to the population decay measurement at the second location of the validity, specifically, of either the earlier or current value of the neutron characteristic measured at the first location as a measure of the intrinsic value of the neutron characteristic and, generally, of the validity of other neutron-logging derived data as well. Advantageously, the neutron characteristic measured is a thermal neutron absorption characteristic of the formation, such as the thermal decay time constant. In effect, apparent values of the neutron characteristic are observed at both measurement locations and a comparison of these observations made to determine the extent of correlation therebetween. Close agreement of the apparent values indicates an accurate measurement of the intrinsic formation characteristic. Substantial disagreement between the apparent values evidences that perturbational effects have significantly influenced the neutron characteristic measurement and that appropriate correction of the measurement should be made.

47 Claims, 6 Drawing Figures

NEUTRON LOGGING RELIABILITY TECHNIQUES AND APPARATUS

BACKGROUND OF THE INVENTION

1. Field of the Invention

This invention relates in general to neutron logging of earth formations and, in particular, to novel apparatus and procedures for determining the validity, or reliability, of data derived at least in part by logging neutron characteristics of earth formations and, if desired, for affording verifiably accurate indications of such data.

2. The Prior Art

In well logging, and particularly in the logging of cased holes, neutron logging techniques have been found especially useful in investigating connate fluid conditions in formations surrounding a borehole. For example, in one form of pulsed neutron well logging, thermal neutron characteristics of the formations, e.g., the thermal neutron decay time constant ($\tau$) and the macroscopic absorption cross section for capture of thermal neutrons ($\Sigma$), are measured to differentiate between oil-bearing and water-bearing formations. Other neutron characteristics of the formations, the neutron slowing down time for instance, may be logged as well. These characteristics, when combined with certain known formation parameters, allow information of such formation properties and conditions as porosity, water saturation, water salinity, gas-oil contacts, and the like to be derived. For interpretation of these data to have validity, however, the logged quantities must accurately represent actual formation conditions; that is to say, there must be assurance that the logging data generated do in fact afford accurate knowledge of the precise formation characteristics and parameters of interest.

In interpreting thermal neutron decay time logs, for instance, it is desirable that the recorded neutron characteristics, typically the theremal neutron decay time constant ($\tau$, in units of microseconds) and the macroscopic absorption cross section for capture of thermal neutrons ($\Sigma$, in units of cm$^2$/cm$^3$, or cm$^{-1}$), be representative of the intrinsic values of the decay time ($\tau_{int}$) and the macroscopic cross section ($\Sigma_{int}$) of the formation under study, which are actual properties characteristic of the formation materials. The $\tau_{int}$ of a formation is related to its capture properties by $\tau_{int} = 4.55/\Sigma_{int}$, and hence is simply the time constant for neutron absorption. The logged, or apparent, values $\tau_{log}$ and $\Sigma_{log}$ are similarly related, i.e., by $\tau_{log} = 4.55/\Sigma_{log}$, buy may differ from the intrinsic values $\tau_{int}$ and $\Sigma_{int}$ because of perturbing factors influencing their measurement.

According to one technique of thermal decay time logging, a neutron generator in the logging tool repeatedly emits discrete pulses of high-energy, e.g., 14 Mev, neutrons. Following each pulse the neutrons collide with nuclei of the materials in the borehole environment, including the formation matrix and fluids. These collisions rapidly slow the neutrons to thermal velocities, and they are then captured by other nuclei with corresponding emissions of gamma radiation. Relative changes in the thermal neutron population in the borehole environment are sampled by suitable radiation detectors, e.g., a gamma-ray detector or a thermal neutron detector, placed a short distance from the neutron source. By sampling the neutron populations at an appropriately long time after each neutron pulse, the effects of the borehole fluid and casing media on the population decay rate may be rendered essentially negligible, so that the measured decay rate typifies the formation. The period of measurement is additionally selected such that the thermal neutron population decreases exponentially during the period, and the thermal decay time measurement ($\tau_{log}$ or $\tau_{meas}$) is thus the corresponding apparent decay time constant of the formation.

If capture (absorption) were the only process by which neutrons disappear in a given region of a formation, the measured decay time ($\tau_{log}$) would be equal to the intrinsic decay time ($\tau_{int}$) of the formation. Moreover, $\tau_{log}$ would be the same wherever measured along the formation, assuming of course, a homogeneous media. The thermal neutron density, however, does not decay at the same rate at all points in a formation. This is because, in addition to disappearing by capture, the neutrons are diffusing, or moving through the formation, resulting in local changes in neutron density independent of the absorption process. If the outflow of neutrons from the measurement region exceeds the inflow, the apparent decay of the neutron population will be faster than absorption alone would produce, and conversely. Thus, if the thermal neutron density in the formation is highest near the neutron source, as is normally the case, the apparent decay time ($\tau_{log}$) will be correspondingly shorter near the source and longer at greater distances. This discrepancy, which at low porosities may result in a reduction in $\tau_{log}$ below $\tau_{int}$ in excess of 25 percent, may strongly influence the accuracy of $\tau_{log}$ and hence its validity as a measure of $\tau_{int}$. Since $\rho$ an $\Sigma$ are reciprocally related, $\Sigma_{log}$ is also subject to error, as are other logging data derived from $\tau_{log}$ and $\Sigma_{log}$. It is important, therefore, that knowledge be provided as to the reliability, or validity, of $\tau_{log}$ and $\Sigma_{log}$ as accurate measurements of the corresponding intrinsic characteristics so that appropriate corrective action can be taken, if needed, to provide more precise measurements or at least to know when the measurements are suspect.

U.S. Pat. No. 3,509,342, dated Apr. 28, 1970, to J. T. Dewan, and assigned to the assignee of the present application, concerns equipment and procedues for accounting for the influence of diffusion on neutron absorption characteristic measurements. A diffusion correction factor is developed, based on the algebraic difference of two observed values of an absorption characteristic and other formation parameters, and applied to one observed value to provide a more accurate measurement of the characteristic. While the Dewan procedures afford useful information, still other techniques for assuring that accurate neutron logging data are obtained are desired.

SUMMARY OF THE INVENTION

The novel reliability procedures and apparatus of the present invention fulfill the foregoing and other requirements of the prior art. Essentially, the invention encompasses measuring the neutron populations at two spaced locations in a formation, observing the apparent values of a selected neutron characteristic of the formation which correspond to the neutron population measurements, and comparing the observed apparent values to determine the degree of correlation therebetween. Close agreement of the two observed values indicates that neutron diffusion and other perturbational effects have not unduly influenced the neutron population measurements, and thus that at least one of the observed values is sufficiently representative of the intrinsic value of the neutron characteristic to allow valid interpretation of the logged data. Substantial departure from agreement of the observed values, on the other hand, indicates that the influence of such perturbational effects has been significant and that a corrected value should be derived. Advantageously, the neutron characteristic measured is the thermal neutron decay time constant ($\tau$), though such other characteristics as the macroscopic absorption across section ($\Sigma$) or the neutron slowing down time could additionally or alternatively be employed. Observation of the apparent values may take the form of an actual quantitative measurement of both apparent values. Moreover, as a further improvement in accordance with the invention, a quantitative measurement of the apparent value corresponding to only one neutron population decay measurement may be made, with the comparison between it and the apparent value corresponding to the second neutron population decay measurement being effected without actually measuring the other apparent value itself.

In one embodiment, the thermal neutron populations at two spaced locations (designated 1 and 2) in the formation are measured during time periods between neutron pulses that are functionally related to a neutron characteristic, e.g., the apparent thermal neutron decay time constant ($\tau$). The value of $\tau_{app}$ (or $\tau_{meas}$) corresponding to each neutron population measurement is then derived, and the ratio of the two $\tau_{app}$ values is formed as an indication of the degree of agreement or departure of the two values. if the $\tau_{meas}$ values are nearly identical, i.e., $\tau_1/\tau_2$ approaches unity, one or both values may be taken as an accurate measurement of $\tau_{int}$. Preferably, the time period during which the neutron population measurement is made at each location is controlled in accordance with $\tau_{meas}$ at that location.

In accordance with a particularly advantageous embodiment, the invention affords the desired reliability information while requiring an actual quantitative measurement of an apparent value of the neutron characteristic at one location only. The thermal neutron population at the location is measured during two distinct time intervals between pulses, the ratio of the population measurements during the two intervals is formed, and the adjustments to the timings of the intervals required to maintain the ratio at a predetermined number are determined. The adjustments are made such that the adjusted duration of one of the detection intervals provides a measurement of $\tau_{app}$ corresponding to the population measurement at that location. Following a subsequent pulse, the measurement intervals at the second location are equated to the adjusted interval timings determined at the first location, and the ratio of the measured neutron populations at the second location during the first and second adjusted intervals is formed and compared with the same or an equivalent predetermined number. If this second ratio closely approaches that number, the apparent value of the thermal neutron decay time measured at the first location may be confidently accepted as an accurate measure of $\tau_{int}$. As the second neutron population ratio is, to a close approximation, linearly related to the ratio ($\tau_1/\tau_2$) of the observed $\tau$'s at the first and second locations, it may be converted to $\tau_1/\tau_2$ and the reliability comparison made by viewing the nearness of $\tau_1/\tau_2$ to unity. A corrected value of $\tau_{log}$, here $\tau_1$, or of $\Sigma_{log}$, etc., may then be made by suitable application of the $\tau_1/\tau_2$ ratio to $\tau_{meas}$ or $\Sigma_{meas}$. Alternatively, a precise measurement of the intrinsic value of the neutron characteristic may be obtained by a direct solution of the exponential function relating the neutron population measurements and the characteristic.

BRIEF DESCRIPTION OF THE DRAWINGS

For a better understanding of the invention, reference may be made to the following description and to the accompanying drawings, in which.

DESCRIPTION OF ILLUSTRATIVE EMBODIMENTS

In broad terms, the present invention is directed to the provision of information as to the reliability, or validity, of logged values of formation and fluid properties which characterize the reactions between the materials composing the formation matrix and fluids and incident irradiations of neutrons. Based on this information, appropriate corrective steps may then be taken, when indicated, to assure that accurate values are obtained. As indicated above, such properties or "neutron characteristics" include, for example, $\tau$, $\Sigma$, and the neutron slowing down time. In accordance with the invention, any suitable neutron characteristic may be employed in deriving the reliability information, though $\tau$ affords certain advantages and is preferred. In connection with the description of FIG. 1 and the other views of the drawings, therefore, the neutron characteristic selected is assumed to be the thermal neutron decay time constant ($\tau$).

Figure 1:
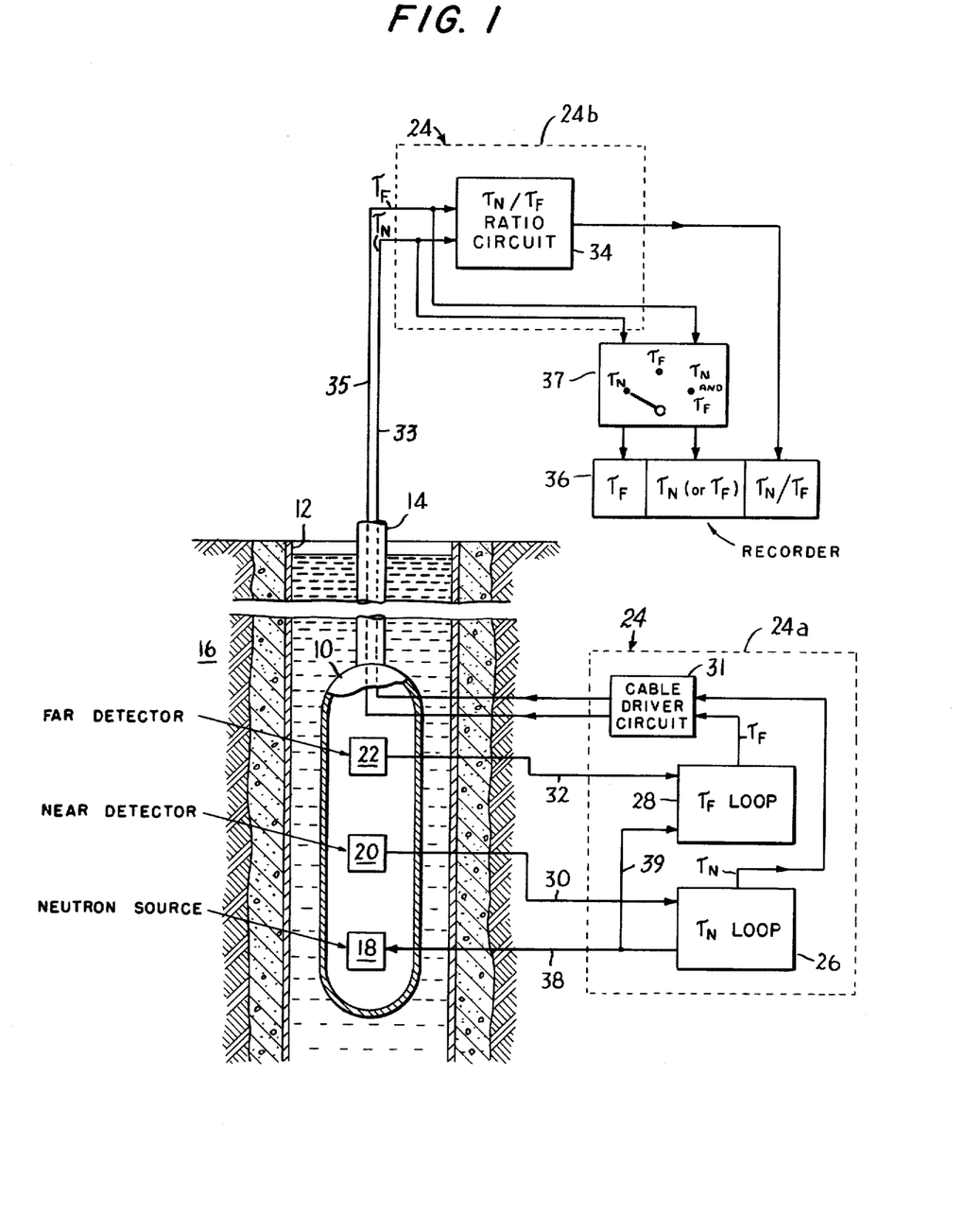
FIG. 1 is a schematic block diagram illustrating representative apparatus for deriving verifiably accurate neutron logging information in accordance with the invention.

As depicted schematically in FIG. 1, a representative embodiment of neutron logging apparatus constructed in accordance with the invention includes a fluid-tight, pressure-resistant tool 10 that is adapted to be suspended in a cased borehole 12 by an armored cable 14 for investigating a subsurface earth formation 16. Although, as noted, neutron logging techniques have special utility in cased-hole logging, the invention has application as well to open-hole logging. The tool 10 includes a pulsed neutron source 18 and two spaced radiation detectors 20 and 22. The neutron source 18 is adapted to generate discrete pulses of high-energy neutrons (14Mev), and suitably may be of the types described in more complete detail in U.S. Pat. No. 2,991,364, to Goodman, dated July 4, 1961, and U.S. Pat. No. 3,546,512 granted to Frentrop on Dec. 8, 1970, both commonly owned with this application. The radiation detectors 20 and 22 are positioned to respond in proportion to the density of thermal neutrons in the formation 16 and, to that end, may be of the thermal neutron-sensitive type, e.g., helium-3 filled proportional counters, or they may be gamma-ray detectors, e.g., embodying sodium iodide scintillation crystals, adapted to respond to gamma radiation resulting from the capture of thermal neutrons by nuclei of formation elements. For purposes of illustration herein, the detectors 20 and 22 are assumed to be sodium iodide-type gamma radiation detecting devices.

The detectors 20 and 22 are located on the same side of the neutron source 18 and preferably are positioned in the top portion of the tool 10 so that they will be vertically above the source 18 as the tool is drawn upward through the borehole. Advantageously, the short-spaced or "near" detector 20 is placed such that the geometric center of its scintillation crystal (not shown) is positioned approximately 13 ½ inches from the targets (not shown) of the neutron source 18. The scintillation crystal may be on the order of four inches in length and is optically coupled in conventional fashion to a photomultiplier tube. The geometric center of the scintillation crystal of the long-spaced or "far" detector 22 may be located approximately 25 inches from the neutron source target. It too is optically coupled to a photomultiplier tube. Although not shown, it will be understood that the tool 10 includes appropriate amplification and discrimination circuitry for eliminating noise and other electrical signals that are unrelated to the nuclear processes under observation and for amplification of the radiation-related signals for transmission to the signal processing circuitry.

The processing circuitry may be located at the surface or partly at the surface and partly in the well tool. In FIG. 1, this circuitry, indicated generally by reference numeral 24, is shown as having downhole components 24a and uphole components 24b. The downhole signal processing circuitry 24a includes two signal processing loops 26 and 28 which are coupled by conductors 30 and 32 to the near detector 20 and the far detector 22, respectively. The loops 26 and 28 may be of any construction appropriate to the derivation of $\tau$ and the subsequent control of the detection interval gates. For example, the circuitry of U.S. Pat. No. 3,662,179, issued May 9, 1972, to Frentrop et al., and assigned to the assignee of the present application, may be utilized. Operating on the radiation-related signals from the respective detectors 20 and 22, the signal processing loops 26 and 28 derive apparent values of $\tau$ which correspond to the rates of decay of the thermal neutron populations at the two detector locations. The signals representative of $\tau_{meas}$ ($=\tau_N$) corresponding to the near detector decay measurement and $\tau_{meas}$ ($=\tau_F$) corresponding to the far detector decay measurement are applied to a cable driver circuit 31 of any appropriate construction for transmission over conductors 33 and 35, respectively, to the surface processing circuitry 24b. There, the $\tau_N$ and $\tau_F$ signals are inputted to an analog ratio forming circuit 34 where the ratio $\tau_N/\tau_F$ is formed. Either one or both of the $\tau_N$ and $\tau_F$ signals, along with an output signal from the ratio circuit 34 indicative of $\tau_N/\tau_F$, may be applied to a recorder 36. Because of its greater statistical accuracy, $\tau_N$ is normally recorded as $\tau_{log}$. According to the invention, however, in certain circumstances, as explained hereinafter, $\tau_F$ more closely approximates $\tau_{int}$ than does $\tau_N$. In such cases, therefore, it may be desirable to record $\tau_F$ in addition to, or in place of, $\tau_N$. To that end, a selector switch 37 may be provided in association with the recorder 36. Suitably, the recorder 36 comprises both tape recording apparatus and visual recording apparatus for producing the customary record of signals as a function of logging tool depth, i.e., the depth below the earth's surface at which the measurements were made.

In accordance with the teachings of Frentrop et al. U.S. Pat. No. 3,662,179, the operation of the neutron source 18 is controlled as a function of a measured value of $\tau$. That is to say, both the duration of the individual neutron pulses and the elapsed time between successive pulses are varied in proportion to $\tau_{meas}$. Hence, in FIG. 1 the $\tau_N$ loop 26 is shown connected to the neutron source 18 by a conductor 38, and output signals from the $\tau_N$ loop 26 are passed on the line 38 so as to cause source 18 to emit neutron pulses that are a specified multiple of $\tau_N$ in duration and at intervals of specified multiples of $\tau_N$. If desired, the $\tau_F$ loop 28 could be used to control the operation of the neutron source 18, in which case the conductor 38 would lead to that loop. In any event, only one of the two $\tau$ loops controls the neutron source operation, and the $\tau$ loop which is not employed for this purpose will be modified accordingly from the structures described in the Frentrop et al., patent. The latter $\tau$ loop needs, of course, a synchronizing signal related to the end of each neutron pulse for proper time control of the detection intervals for the associated detector. This signal can be obtained from the neutron source-controlling loop, as indicated in FIG. 1 by the conductor 39 leading from the $\tau_N$ loop 26 to the $\tau_F$ loop 28.

Although improved results are obtained with $\tau_{meas}$-controlled neutron pulses and repetition rates, this is not essential to the invention, and fixed duration pulses occurring at fixed intervals may be employed instead, in which case the $\tau$ loops may be located at the surface and may be synchronized from a common signal derived from the tool 10 corresponding to the end of each neutron pulse. If desired, control of the neutron source as a function of $\tau_{meas}$ may be retained with one or both of the $\tau$ loops located uphole. In this case, the downhole circuitry of the FIG. 1 embodiment may take the construction described in U.S. Pat. No. 3,609,366, dated Sept. 28, 1971, to Schwartz, and commonly owned with the present application, though that patent shows amplification, discrimination and transmission circuitry for only one radiation detector. Duplicate circuits could of course be readily provided for the second detector. The circuitry of U.S. Pat. No. 3,566,116 to Nelligan, dated Feb. 23, 1971, coassigned with the present application, could also be used. The $\tau$ computation and gate control circuitry of the Nelligan patent could likewise be employed.

Returning now to FIG. 1, the $\tau_N$ loop 26 solves for a value of $\tau_N$ by measuring the rate of decay (absorption) of thermal neutrons in the formation opposite the location of the near detector 20. According to a preferred measurement sequence, successive neutron pulses, of one decay time ($\tau$) duration, are spaced from each other by intervals of a suitable multiple of $\tau$, e.g., $12\tau$ to $15\tau$ in length. The neutron population is sampled, i.e., the number of individual gamma ray events per unit time detected by the near detector 20 is measured during three separate time intervals, or gates, between neutron pulses. A first population count rate ($N_1$) is taken during an interval I one decay time ($\tau$) long that begins two decay times ($2\tau$) after the preceding neutron pulse has terminated. The second time interval II, during which a second neutron population count rate ($N_2$) is taken, begins immediately after the first interval and is two decay times ($2\tau$) in length. When gamma radiation detectors are utilized, background gamma radiation is measured during the third detection interval III, and this background count rate preferably is made during an interval three decay times ($3\tau$) in length that is initiated six decay times ($6\tau$) after the end of the preceding neutron pulse. The curve of FIG. 3, as is described more fully hereinafter, applies only to this gate sequence.

In broad terms, the background count rate ($N_3$) is subtracted proportionately from the first interval count rate $N_1$ and the second interval count rate $N_2$ to provide a measure of the count rates, $N_1$(net) and $N_2$(net), respectively, during the first and second time intervals due to neutron population only. The ratio $N_1$(net)/$N_2$(net) is then formed and the durations of the first and second detection intervals are adjusted in a one-to-two ratio until the count rate ratio $N_1$(net)/$N_2$(net) equals 2.0. When this ratio is equal to 2.0, a condition of equilibrium is achieved and the thermal neutron decay time $\tau_{meas}$, in this case $\tau_N'$ closely approximates the duration (T) of the first detection interval. Departures from this equilibrium condition result in a loop action that corrects the first gate width until equilibrium is restored to the system. A signal representative of the loop value of $\tau_N$ is sent to the ratio circuit 34 and to the recorder 36.

The $\tau_F$ loop 28 operates in essentially the same manner, taking the separate neutron population count rates $F_1$, $F_2$ and $F_3$ and controls its own gating sequence in accordance with the measured value of $\tau_F$. The $\tau_F$ gating sequence, like the $\tau_N$ gating sequence, relies upon a synchronizing pulse corresponding to the end of the proceding neutron pulse. The loop value of $\tau_F$ is applied to the ratio circuit 34 and, if desired, to the recorder 36.

As has already been pointed out, perturbational effects (chiefly neutron diffusion but also including formation inhomogenities, etc.) the values of $\tau_N$ and $\tau_F$ would be the same and would equal or closely approximate $\tau_{int}$. It follows, therefore, that the degree of agreement of $\tau_N/\tau_F$ with unity is indicative of the reliability, or validity, of the loop values of the thermal neutron decay time as a measure of the intrinsic value of the constant. Conversely, the degree of departure of $\tau_N/\tau_F$ from unity provides an indication of the significance of neutron diffusion and other effects on $\tau_{log}$.

Under the borehole conditions typically encountered, $\tau_F$ would be expected to exceed $\tau_N$ because of the influence of neutron diffusion. The ratio $\tau_N/\tau_F$ thus can normally be expected to be slightly less than, but close to, unity. When $\tau_N/\tau_F$ is substantially less than unity, e.g., within the range of from 0.8 to 0.9, absent a known explanation for the departure from unity, it is an indication that the measured value of $\tau_N$ has been strongly influenced by perturbational effects, probably diffusion, and is suspect. Where $\tau_N$ is recorded as $\tau_{log}$, therefore, a corrected value of $\tau_{log}$ ($\Sigma_{log}$, etc.) should be derived. This may be done by referring to diffusion departure charts, or alternatively, by recording $\tau_F$ as $\tau_{log}$. $\tau_F$ is less affected than $\tau_N$ by perturbational effects and, when statistical variations can be averaged out to a satisfactory degree, affords a comparatively accurate measurement of $\tau_{int}$.

It is a particularly advantageous feature of the invention that information as to the reliability of $\tau_{log}$, and $\Sigma_{log}$, therefrom, may be obtained by yet simpler techniques and apparatus. One embodiment of such simplified apparatus is disclosed in FIG. 2. As before, the downhole signal processing circuitry 124a includes a $\tau_N$ loop 126, which, for example, may be coupled to the neutron source 118 and near detector 120 by conductors 138 and 130, and suitable cable drive circuitry 131.

Figure 2:
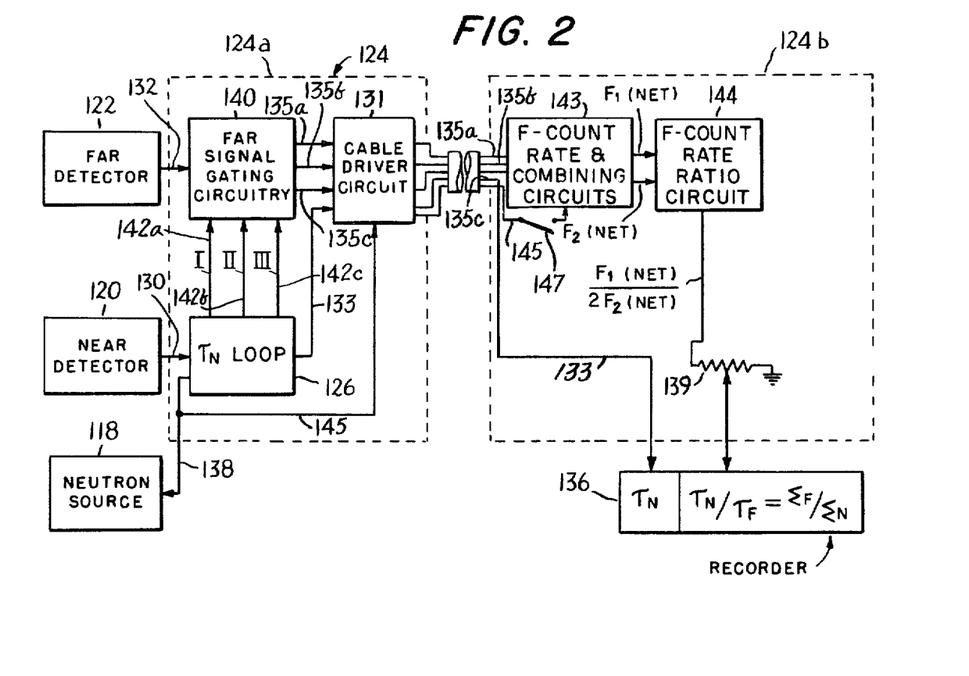
FIG. 2 portrays schematically still another way in which reliability information may be provided according to the present invention.

The operation of the $\tau_N$ loop 126 is essentially the same as in the FIG. 1 embodiment, and a $\tau_N$ output signal is sent uphole over conductor 133 to the recorder 136 for recording. In place of a $\tau_F$ loop, the signals from the far detector 122 are sent over a conductor 132 to a gating circuit 140, the operation of which is controlled by signals transmitted to it over conductors 142a, 142b and 142c from the $\tau_N$ loop 126. The gate signals applied to the far signal gate circuit 140 control the times of occurrences and durations of the three detection time intervals between neutron pulses in accordance with the measured value of $\tau_N$ in the same manner as the detection intervals I, II and III for the near detector 120 are controlled by the $\tau_N$ loop. Hence, the near and far detectors are simultaneously interrogated over detection intervals coincident in time and duration.

The neutron population signals passed by the gate circuit 140 during the detection intervals are transmitted uphole to the surface components 124b over conductors 135a, 135b and 135c and are counted in count rate and combining circuits 143. The circuits 143 in effect count the number of gamma ray events per unit time occurring during the first and second detection intervals and proportionately subtract from those count rates the background gamma radiation count rate measured during the third detection interval. The net count rates $F_1$(net) and $F_2$(net) from the first and second intervals, respectively, are compared in an analog ratio circuit 144 which produces an output signal indicative of the ratio $F_1$(net/$2F_2$(net). As described more fully below, this ratio, to a very close approximation, is linearly related to $\tau_N/\tau_F$ under most logging conditions, where $\tau_F$ is the decay time constant corresponding to the thermal neutron decay rate measured at the far detector 122. It thus indicates the degree of agreement between $\tau_N$ and $\tau_F$ and hence the validity of the recorded value of $\tau_N$ as a measure of $\tau_{int}$ of the formation under investigation.

Figure 3:
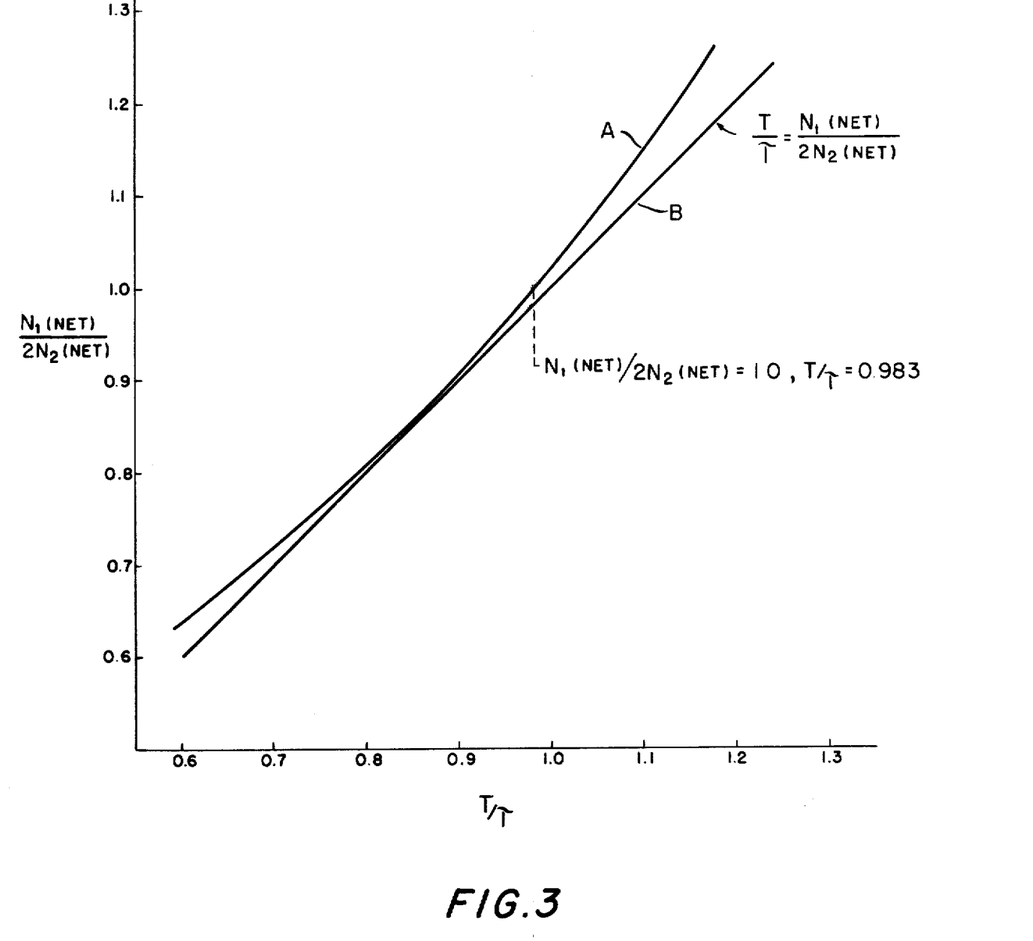
FIG. 3 is a graphical representation showing the correlation between the ratio $T/\tau_x$ and the count rate ratio $N_1$ (net)/$2N_2$(net) for a preferred detector gating sequence.

That $F_1$(net)/$2F_2$(net) does in fact closely approximate $\tau_N/\tau_F$ is clear from inspection of FIG. 3. In deriving the value of $\tau_N$ in the $\tau_N$ loop 126, it is assumed that when $N_1$(net)/$N_2$(net)=2, the duration (T) of the first detection interval is equal to the value of $\tau$ corresponding to the thermal neutron decay rate observed at the near detector. This equality is not exact, however, so that the ratio $T/\tau_N$ is not exactly unity when $N_1$(net)/$2N_2$(net)=1.0. The actual relationship of $T/\tau$ (=$T/\tau_N$) to $N_1$(net)/$2N_2$(net) is represented by line A of FIG. 3 for the detector gating sequence referred to above, i.e., where the first detection interval begins $2\tau$ after the termination of the preceding neutron pulse and is $1\tau$ in duration, the second detection interval is initiated at $3\tau$ and extends for $2\tau$ in length, and the third detection interval starts at a time $6\tau$ after the end of the neutron pulse and has a duration of $3\tau$. Line B has a 45° slope, which would be the case if the two ratios were equal. Experimentation has shown that under the borehole conditions normally encountered, the value of $N_1(net)/2N_2(net)$ normally falls within the range of from about 0.8 to 1.0. Comparison of lines A and B of FIG. 3 over this range shows that a close, substantially linear relationship exists between the N-count rate ratio $N_1(net)/2N_2(net)$ and the $T/\tau_N$ ratio throughout the range. For example, when the N-count rate ratio equals 1.0, $T/\tau_N = 0.983$, only 1.7 percent below unity. Agreement between $T/\tau_N$ and $N_1(net)/2N_2(net)$ becomes even better as a N-count rate ratio of 0.8 is approached. The ratio $N_1(net)/2N_2(net)$ is thus a good approximation of the correlation of T to $\tau_N$.

FIG. 3 also is valid for $T/\tau_F$ vs. $F_1(net)/2F_2(net)$. But since T (the duration of the first detection time interval) is, in the FIG. 2 embodiment, set equal to $\tau_N$ by the action of $\tau_N$ loop 126, $T/\tau_F$. It is apparent, therefore, that $F_1(net)/2F_2(net)$ closely approaches, and is linearly related to, $\tau_N/\tau_F$. Thus merely by making the comparison $F_1(net)/2F_2(net)$, a close approximation of $\tau_N/\tau_F$ is obtained, and a $\tau_N/\tau_F$ curve can be provided. The $\tau_N/\tau_F$ ratio, as has already been pointed out, is indicative of the validity of $\tau_N$ as a measure of $\tau_{int}$ of the formation. Repeating, if $\tau_N/\tau_F$ is close to 1.0, it may be assumed that the principal factor influencing the $\tau_N$ measurement was the absorption process, and that the influence of such perturbational effects as neutron diffusion was not significant.

Preferably, the actual comparison of $F_1(net)/2F_2(net)$ made in the F-count rate ratio circuit 144 is:

$$F_1 - \tfrac{1}{3} F_3 / F_2 - \tfrac{2}{3} F_3 \qquad (1)$$

This ratio, divided by two, should be unity if $\tau_N$ equals $\tau_F$. The gating of both detectors is controlled by the $\tau_N$ loop 126, which responds to $\tau_N$ only. Thus:

$$\tau_F = \tau_N \text{ if } F_1(net)/F_2(net) = 2, \text{ or}$$
$$F_1(net) = 2F_2(net) \qquad (2)$$

In terms of the total $F_1$ and $F_2$ count rates measured by the count rate components of circuits 143, the $F_1$ and $F_2$ count rates must be corrected for background. Hence, expression (1) since:

$$F_1(net) = F_1 - \tfrac{1}{3} F_3, \text{ and} \qquad (3)$$

$$F_2(net) = F_2 - \tfrac{2}{3} F_3 \qquad (4)$$

Alternatively, digital circuits could perform these functions of circuits 143. Such circuits would include the functions of counting, storing and binary-to-analog conversion. Appropriate circuits for this purpose are described in the aforementioned Schwartz U.S. Pat., No. 3,609,366, and need only be modified to include suitable circuitry for resetting the counters to zero after completion of each counting sequence. To that end, the fire signal from the $\tau_N$ loop 126 to the neutron source 118 could also be sent uphole over the conductor 145 upon closing of switch 147 to command the counter circuits to transfer the total counts $F_1(net)$ and $F_2(net)$ to buffer registers and, after a suitable delay provided by a delay circuit to allow the foregoing transfer to be accomplished, to reset the counters to zero. The outputs of the binary-to-analog circuits are thus analog voltages which are proportional to $F_1(net)$ and $F_2(net)$. If desired, suitable filters could be included in the output circuits of the binary-to-analog converters, or in the input circuits of the ratio circuit 144, to filter out switching transients from the $F_1(net)$ and $F_2(net)$ output signals.

If desired, the ratio $(F_1 - \tfrac{1}{3} F_3)/(F_2 - \tfrac{2}{3} F_3)$ may be logged as a function of depth in recorder 136. In view of its close linear relationship to $\tau_N/\tau_F$, however, the count rate ratio preferably is scaled, by means of the application of an appropriate proportionality factor in a potentiometer 139, to yield a depth record of $\tau_N/\tau_F$ (see FIG. 2). Since $\tau$ and $\Sigma$ are reciprocally related, the $\tau_N/\tau_F$ curve may alternatively be labeled $\Sigma_F/\Sigma_N$.

Figure 4:
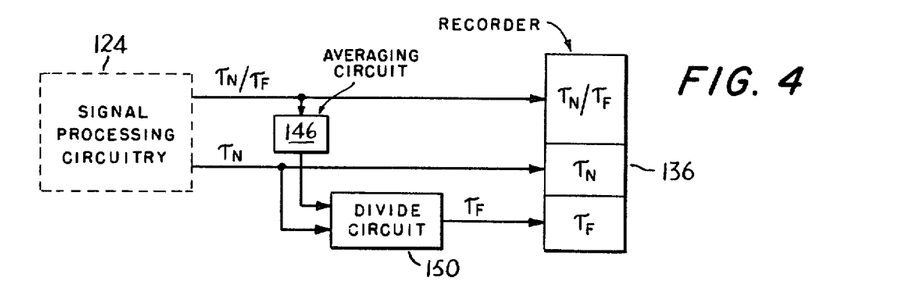
FIG. 4 is a schematic view of circuitry for affording in the embodiment of FIG. 2 a recorded value of $\tau_F$.

As noted, the value of $\tau_N$ can be corrected by perturbational effects by the use of departure charts, when this is indicated by the $\tau_N/\tau_F$ ratio being out of limits, e.g., as low as 0.8 to 0.9. Alternatively, a reasonably good diffusion correction of $\tau_{log}$ can be made by dividing $\tau_N$ by the $\tau_N/\tau_F$ ratio, after averaging out statistical variations of the ratio. This operation is depicted in FIG. 4, where the $\tau_N/\tau_F$ output of the circuitry 124 is applied both to the recorder 136, as in FIG. 2, and to an averaging circuit 146. The $\tau_N$ signal from circuitry 124 is sent to the recorder 136 and, together with a signal representative of the averaged $\tau_N/\tau_F$ value from circuit 146, is inputted to a divide circuit 150. Division of $\tau_N$ by $\tau_N/\tau_F$ gives the apparent value of $\tau_F$ corresponding to the neutron population decay rate measurement at the far detector 122. This value very closely approaches $\tau_{int}$, as evidenced by the exemplary data tabulated in Table I. These data are for a 5½ inch casing in an 8 inch borehole. The intrinsic values of $\tau$ were calculated assuming $\Sigma_{ma} = 5.4$ c.u., $\Sigma_f = 22.2$ c.u. for fresh water, and $\Sigma_f = 123$ C.U. for salt water, where $\Sigma_{ma}$ is the macroscopic capture cross section of the matrix and $\Sigma_f$ is the macroscopic capture cross section of the formation fluid. (1 c.u. $= (10^3\text{cm})^{-1}$)

TABLE I

| | Formation and Borehole Conditions | $\tau_{int}$ | $\tau_N$ | $\tau_F$ | $\tau_N/\tau_F$ |
|---|---|---|---|---|---|
| I | 18% Porous Sandstone Fresh Water in Hole and Formations | 540 | 444 | 543 | 0.82 |
| II | 18% Porous Sandstone Saturated Salt Water | 171 | 156 | 177 | 0.91 |
| III | 33% Porous Sandstone Saturated Salt Water | 103 | 98 | 103 | 0.95 |

$\tau$ values shown are in microseconds.

A similar good correction of $\Sigma_{log}$ can be made by multiplying $\Sigma_N$ by an averaged value of the ratio $\tau_N/\tau_F$.

Figure 5:
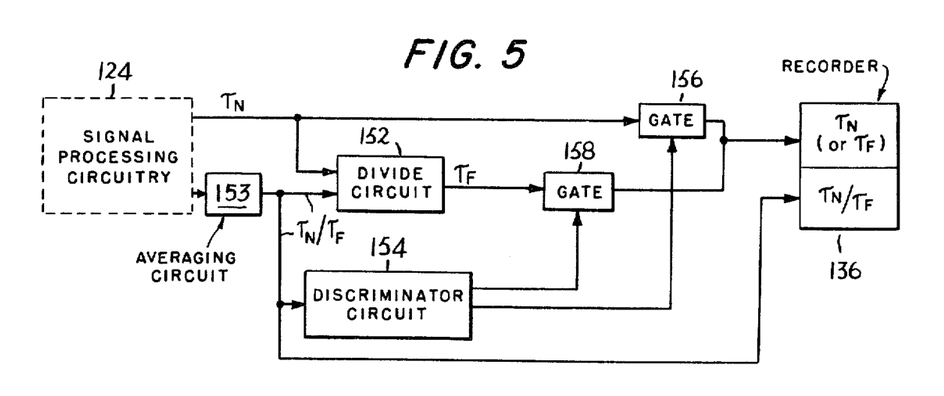
FIG. 5 is a schematic view of circuitry for automatically selecting and recording a value of $\tau_{meas}$ that accurately represents $\tau_{int}$.

As previously described in connection with FIG. 1, a single $\tau$ curve may be provided, with either $\tau_N$ or $\tau_F$ being recorded, in dependence on the accuracy of $\tau_N$ as indicated by $\tau_N/\tau_F$. Selection of the value to be logged may be done manually, as in the embodiment of FIG. 1, or automatically. In FIG. 5, circuitry for automatically selecting $\tau_N$ or $\tau_F$ for recording includes a divide circuit 152, having as inputs $\tau_N$ from the signal processing circuitry 124 and an averaged value of $\tau_N/\tau_F$ from an averaging circuit 153, and as an output $\tau_F$. The averaged $\tau_N/\tau_F$ signal from circuitry 153 is also coupled to a discriminator 154 and to the recorder 136. The discriminator 154 compares $\tau_N/\tau_F$ with a reference value, e.g., a value within the range of from 0.80 to 0.90. If $\tau_N/\tau_F$ is greater than the reference value, a gating signal is transmitted to a $\tau_N$ gate 156 to pass $\tau_N$ to the recorder 136. If $\tau_N/\tau_F$ is less than the reference value, the discriminator sends a gating signal to a $\tau_F$ gate 158 to cause it to pass the $\tau_F$ signals to the recorder. If desired, the $\tau_N/\tau F$ signal from circuitry 124 could be recorded instead of or in addition to the averaged value from circuit 153.

Instead of deriving a corrected value of $\tau_{log}$ by computing $\tau_F$ on the basis of scaling the far detector net counting rate ratio $(F_1 - \frac{1}{3} F_3)/(F_2 - \frac{1}{3} F_3)$ to yield an approximation of $\tau_N/\tau_F$, and then dividing $\tau_N$ by the $\tau_N/\tau_F$ ratio thus provided, the actual value of $\tau_F$ corresponding to the far detector net counting rates may be obtained by solving the exponential function relating the far detector net counting rate ratio and $T/\tau_F$, where T is the duration of the first detection interval which is recorded as $\tau_N$. The ratio of $F_1$(net) to $F_2$(net) expressed in exponential terms is:

$$F_1 - \frac{1}{3} F_3/F_2 - \frac{2}{3} F_3 = 1 - e^{-y} - \frac{1}{3} e^{-4y} (1 - e^{-3y})/e^{-y} (1 - e^{-2y}) - \frac{2}{3} e^{-4y} (1 - e^{-3y})$$

(5)

where $$Y = T/\tau_F \text{ or } \tau_N/\tau_F$$

(6)

Figure 6:
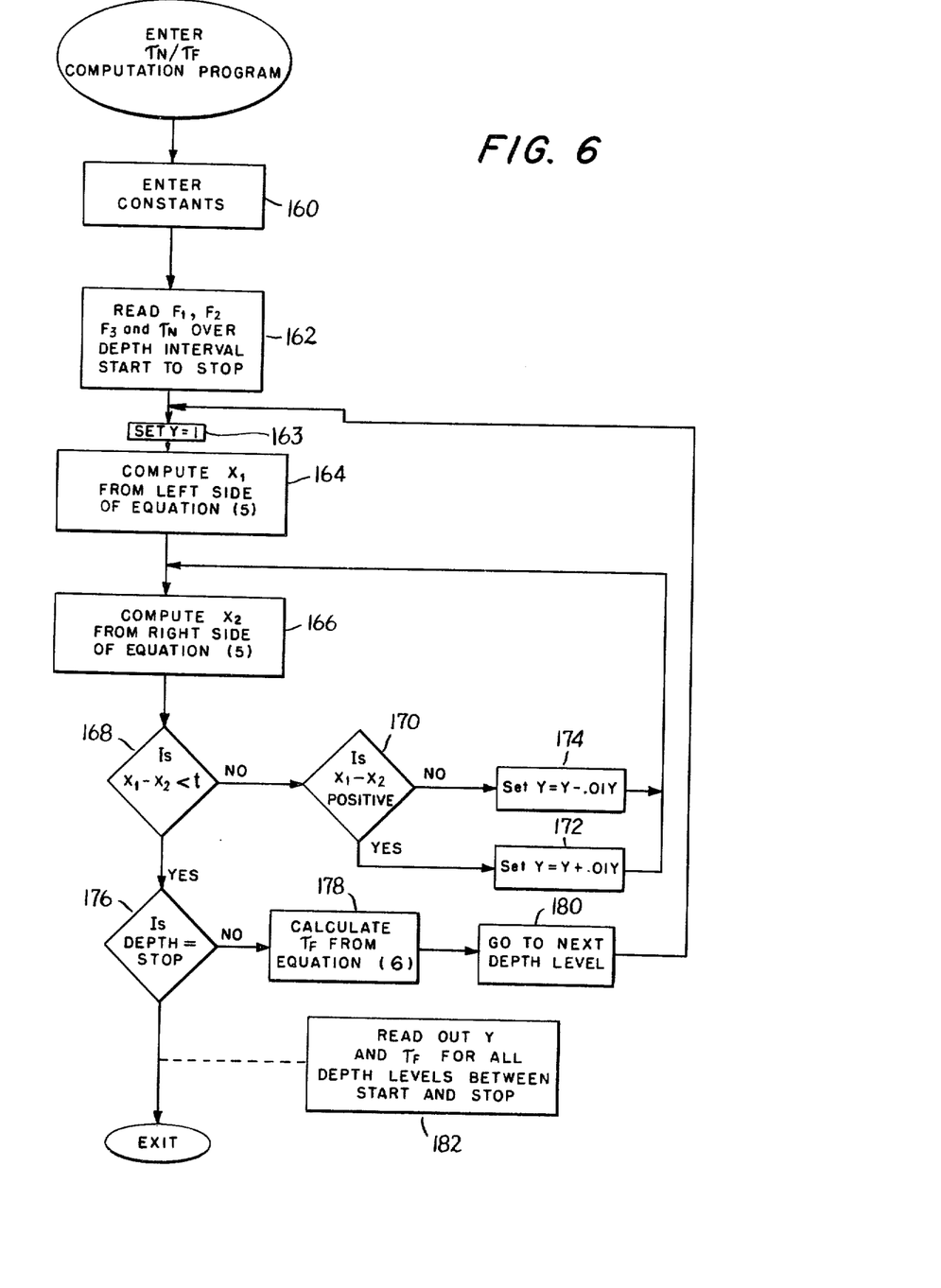
FIG. 6 shows another embodiment of practicing the present invention by appropriately programming a general purpose digital computer.

Equation (5) may be solved for $y$ by the successive approximation method, setting the left side of equation (5) equal to $X_1$, the right side equal to $X_2$, and successively introducing different values of Y until $X_1 - X_2$ is within a predetermined limit $t$, with $\tau_F$ then being determined from equation (6). FIG. 6 illustrates an embodiment of the invention for carrying out this computation.

More particularly, FIG. 6 is a generalized flow diagram which can be used to program a general purpose digital computer, such as, for example, the EMR Computer manufactured by Electromechanical Reasearch, Inc. In FIG. 6, the initial step after entering the program is to enter all constants found in equation (5), and then to read $F_1$, $F_2$, $F_3$ and $\tau_N$ at each depth level, e.g., every six inches, over the borehole interval to be investigated, as represented by boxes 160 and 162, respectively. Once these initial values are obtained, the computer is instructed (box 164) to calculate $X_1$ from the left hand term of equation (5), to set $y = 1.0$ (box 163) and to compute $X_2$ (box 166) from the right hand term for each depth level. A suitable program for carrying out the function of box 166 is commercially available.

Thereafter, a limit test $X_1 - X_2 < t$ is made, as in box 168, to determine if $X_2$ is close enough to $X_1$ to afford a sufficiently accurate value of $\tau_F$. If the test is not satisfied, the next step is to check whether $X_1 - X_2$ is positive, as illustrated in box 170. If positive, $y$ is increased by an appropriate amount, for example 1 percent, as indicated by box 172, and the computer is instructed to recalculate the $X_2$ corresponding to the new value of $y$. Conversely, should $X_1 - X_2$ be negative, Y is descreased by 1 percent (box 174) and $X_2$ is recomputed as before. This procedure is repeated until the test $X_1 - X_2 < t$ is passed.

Upon satisfaction of the $X_1 - X_2 < t$ test, the program instructs the computer to ascertain if the depth level for which $y$ has been determined is equal to the end of investigation interval. This function is illustrated by the diamond-shaped box 176. If it is not, the next steps, illustrated by boxes 178 and 180, are for the computer to solve equation (6) for the value of $\tau_F$ corresponding to the value of $y$ at that depth level and then to go to the next depth level and compute for that depth values of $y$ and $\tau_F$. Values of $y$ and $\tau_F$ are thus derived for all depth levels over the investigation interval. When the final computation is completed, and the test of box 176 is satisfied, the program may order the computer to read out the computed values of $y$ and $\tau_F$ for all depth levels, which function is depicted in FIG. 6 by box 182. The read out may be in any suitable format, such as a playback tape or a tabulation. Alternatively, the program may exit the subroutine of FIG. 6 and enter a subsequent subroutine which utilizes the computed values of $\tau_F$ from the FIG. 6 subroutine.

Although the invention has been described with reference to specific embodiments thereof, many modifications and variations of such embodiments may be made by one skilled in the art without departing from the inventive concepts disclosed. For instance, a particular gating sequence for the near and far detectors has been described. Other sequences may be employed. According to one such alternative sequence, the first and second detection intervals may be timed as in the aforementioned sequence, but the third detection interval may be initiated at 7 decay times ($7\tau$) after the termination of the proceding neutron pulse instead of at 6 decay times ($6\tau$). This will cause the curve (A) of FIG. 3 to be modified slightly. The values of $F_1$ (net)/$2F_2$ (net) produced with the alternative gating sequences are also reliable indicators of the corresponding values of $\tau_N/\tau_F$. Different timings and durations of the first and second detection intervals may also be used. If desired, all of the count rates $N_1$, $N_2$, $N_3$, $F_1$, $F_2$ and $F_3$ and $\tau_{log}$ can be recorded on magnetic tape at the well site, and the computations $F_1$ (net)/$F_2$(net), $\tau_N/\tau_F$, $\Sigma_F/\Sigma_N$, $\tau_F$ and $\Sigma_F$ carried out at a remote location, as, for example, by use of a general purpose digital computer of the aforementioned manufacture.

As a further variation of the invention, the multiconductor cable 14 illustrated in the embodiment of FIGS. 1 and 2 may be replaced by a monocable, with power and control information being transmitted downhole over the monocable and the signals representative of the measured quantity, e.g., $\tau_{meas}$, being transmitted over the monocable to the surface for recording and further processing. Also sent uphole could be the counting rates from the near and far detectors. The cable transmission system of the aforementioned Frentrop et al., patent, suitably modified to include gating and transmitting circuits for the far detector signals, could be employed for this purpose or a time division multiplex system could be used in place of the Frentrop et al., transmission circuitry.

Accordingly, the foregoing and all other such modifications and variations are intended to be included within the spirit and scope of the appended claims.

I claim:

1. A method for providing verifiably accurate logging data derived at least in part by neutron logging of earth formation characteristics, comprising the steps of:

irradiating an earth formation with discrete pulses of high-energy neutrons to produce therein between pulses a population of neutrons, the decay of which is functionally related to intrinsic neutron characteristics of the formation;

detecting indications of the neutron population in the formation between neutron pulses at a first location spaced from the neutron source;

deriving a representation of an apparent value of a selected one of said neutron characteristics corresponding to the detected indications at the first location;

detecting indications of the neutron population in the formation between neutron pulses at a second location spaced from the first location and from the neutron source; and combining said first location apparent value representation and a function of said second location detected indications to derive a representation functionally related to a quotient of the apparent values of said selected neutron characteristic corresponding to the detected neutron population indications at the first and second locations, thereby to provide information as to the validity of said first location apparent value representation as a measurement of the intrinsic value of said selected neutron characteristic.

2. The method of claim 1 wherein said selected neutron characteristic is a thermal neutron absorption characteristic of the formation.

3. The method of claim 1 further comprising the step of recording said quotient-related representation as a function of depth.

4. The method of claim 1 further comprising the step of combining a function of said first location apparent value representation and a function of said quotient-related representation to provide a corrected representation of the intrinsic value of said selected neutron characteristic.

5. The method of claim 4 wherein the first location is spaced closer to the neutron source than is the second location.

6. The method of claim 1 further comprising the steps of:

recording said first location apparent value representation of said selected neutron characteristic at least so long as said quotient-related representation is greater than a predetermined reference value;

combining a function of said first location apparent value representation and a function of said quotient-related representation at least when said quotient-related representation is less than said reference value to provide a corrected representation of the intrinsic value of said selected neutron characteristic; and recording said corrected representation at least when said quotient-related representation is less than said reference value.

7. The method of claim 1 wherein said combining step comprises:

deriving a representation of an apparent value of said selected neutron characteristic corresponding to the detected indications at said second location; and forming the ratio of said first and second location apparent value representations.

8. The method of claim 1 wherein:

said first location apparent value representation deriving step comprises measuring the neutron population in the formation at said first location in response to first location detected indications occurring during a measurement period following a neutron pulse and deriving said apparent value representation from said neutron population measurement; and said combining step comprises controlling the timing of the measurement period following a subsequent neutron pulse as a function of said apparent value representation and measuring the neutron population in the formation at said second location in response to second location detected indications occurring during said controlled measurement period.

9. The method of claim 8 wherein:

the step of measuring the neutron population at the first location comprises measuring the neutron population during each of first and second time intervals within the measurement period following said neutron pulse;

the step of deriving said apparent value representation corresponding to the neutron population measurement at the first location comprises forming the ratio of the neutron population measurements during the first and second time intervals and determining the timings of the first and second intervals required to maintain the neutron population ratio substantially at a predetermined number, the duration thus determined of at least one of the first and second intervals providing a representation of an apparent value of said selected neutron characteristic;

the step of controlling the timing of the measurement period following a subsequent neutron pulse comprises equating the timings of first and second time intervals within said subsequent measurement period to those required to maintain said neutron populations ratio substantially at said predetermined number;

the step of measuring the neutron population at the second location comprises measuring the neutron population during each of the first and second intervals of said subsequent measurement period; and the step of deriving a representation functionally related to a quotient of said apparent values comprises forming the ratio of the neutron population measurements at the second location during the first and second time intervals of said subsequent measurement period.

10. The method of claim 9 further comprising the step of computing a measurement of the intrinsic value of said selected neutron characteristic as a function of said ratio of the neutron population measurements at the second location.

11. The method of claim 9 further comprising the step of combining a function of said first location apparent value representation and a function of said ratio of the neutron population measurements at the second location to provide a representation of the apparent value of said selected neutron characteristic corresponding to the neutron population measurement at the second location.

12. The method of claim 9 further comprising the step of correcting said first location apparent value representation by a function of said ratio of the neutron population measurements at the second location to provide a corrected indication of the intrinsic value of said selected neutron characteristic.

13. The method of claim 12 wherein the first location is spaced closer to the neutron source than is the second location.

14. A method for providing logging data derived at least in part by neutron logging of earth formation characteristics, comprising the steps of:
- irradiating an earth formation with discrete pulses of high-energy neutrons to produce therein between pulses a population of neutrons, the decay of which is functionally related to intrinsic neutron characteristics of the formation;
- measuring the neutron population in the formation at a first location spaced from the neutron source during a measurement period between neutron pulses;
- deriving a representation of an apparent value of a selected one of said neutron characteristics corresponding to the neutron population measurement at the first location;
- measuring the neutron population in the formation at a second location spaced from the first location and from the neutron source during a measurement period between neutron pulses to produce second location neutron population measurements;
- combining said first location apparent value representation and a function of said second location neutron population measurements to derive a representation related to a function of the apparent values of said selected neutron characteristic corresponding to said neutron population measurements at the first and second locations; and
- combining said first location apparent value representation and said representation related to a function of the first and second location apparent values to derive a representation of an apparent value of said selected neutron characteristic corresponding to the neutron population measurement at the second location.

15. The method of claim 14 wherein said selected neutron characteristic is a thermal neutron absorption characteristic of the formation.

16. The method of claim 14 wherein the first location is spaced closer to the neutron source than is the second location.

17. The method of claim 14 wherein:
- the step of deriving said first location apparent value representation comprisese controlling the timing of first and second detection intervals within the measurement period as a function of said apparent value representation;
- the step of combining said first location apparent value representation and a function of said second location neutron population measurements comprises controlling the measuring of the neutron population at the second location so as to provide a measurement of the neutron population at said second location during each of said first and second detection intervals; and
- the function of said second location neutron population measurements combined with said first location apparent value representation is a function of the ratio of the first and second detection interval neutron population measurements at the second location.

18. The method of claim 17 wherein the representation derived by combining said first location apparent value representation and said ratio function of the second location neutron population measurements is related to the ratio of the apparent values of said selected neutron characteristic corresponding to the neutron population measurements at said first and second locations.

19. The method of claim 18 wherein the step of combining said first location apparent value representation and said apparent values ratio-related function comprises dividing said first location apparent value representation by said apparent values ratio-related function.

20. A method for providing verifiably accurate logging data derived at least in part by neutron logging of earth formation characteristics, comprising the steps of:
- irradiating an earth formation with discrete pulses of high-energy neutrons, the decay of which is functionally related to intrinsic neutron characteristics of the formation;
- detecting indications of the neutron population in the formation between neutron pulses at a first location speed from the neutron source;
- deriving a representation of an apparent value of a selected one of said neutron characteristics corresponding to the detected indications at the first location;
- detecting indications of the neutron population in the formation between neutron pulses at a second location spaced from the first location and from the neutron source;
- combining said first location apparent value representation and a function of said second location detected indications to derive a representation functionally related to the quality of said first location apparent value representation as a measurement of the intrinsic value of said selected neutron characteristic; and
- combining said first location apparent value representation and said quality representation to derive a representation of an apparent value of said selected neutron characteristic corresponding to the detected indications at said second location, thereby to provide a more accurate measurement of the intrinsic value of said selected neutron characteristic.

21. The method of claim 20 wherein said selected neutron characteristic is a thermal neutron absorption characteristic of the formation.

22. The method of claim 20 further comprising the step of recording one or more of said first location apparent value representation, said quality representation, and said second location apparent value representation as a function of depth.

23. The method of claim 20 wherein:
- the first location apparent value representation deriving step comprises measuring the neutron population in the formation at said first location in response to first location detected indications occurring during a variable measurement period following a neutron pulse and deriving said apparent value representation from said neutron population measurement; and said first location apparent value representation and said second location detected indications function combining step comprises controlling the timing of the measurement period following a subsequent neutron pulse as a function of said first location apparent value representation and measuring the neutron population in the formation at said second location in response to second location detected indications occurring during said controlled measurement period.

24. Apparatus for providing verifiably accurate logging data derived at least in part by neutron logging of eargh formation characteristics, comprising:
a source for irradiating an earth formation with discrete pulses of high-energy neutrons to produce therein between pulses a population of neutrons, the decoy of which is functionally related to intrinsic neutron characteristics of the formation;
means for detecting indications of the neutron population in the formation between neutron pulses at a first location spaced from the neutron source;
means for deriving a representation of an apparent value of a selected one of said neutron characteristics corresponding to the detected indications at the first location;
means for detecting indications of the neutron population in the formation between neutron pulses at a second location spaced from the first location and from the neutron source; and
means for combining said first location apparent value representation and a function of said second location detected indications to derive representation functionally related to a quotient of the apparent values of said selected neutron characteristic corresponding to the detected indications at the first and second locations, thereby to provide information as to the validity of said first location apparent value representation as a measurement of the intrinsic value of said selected neutron characteristic.

25. The apparatus of claim 24 wherein said selected neutron characteristic is a thermal neutron absorption characteristic of the formation.

26. The apparatus of claim 24 further comprising means for recording said quotient-related representation as a function of depth.

27. The apparatus of claim 24 further comprising means for combining a function of said first location apparent value representation and a function of said quotient-related representation to provide a corrected representation of the intrinsic value of said selected neutron characteristic.

28. The apparatus of claim 27 further comprising:
means for recording said first location apparent value representation as a function of depth at least so long as said quotient-related representation is greater than a predetermined value; and
means for recording said corrected representation at least when said quotient-related representation is less than said predetermined value.

29. The apparatus of claim 24 wherein said combining means comprises:
means for deriving a representation of an apparent value of said selected neutron characteristic corresponding to the detected indications at said second location; and
means for forming the ratio of said first and second location apparent value representations.

30. The apparatus of claim 23 wherein:
said first location apparent value representation deriving means comprises means for measuring the neutron population in the formation at said first location in response to first location detected indications occurring during a measurement period following a neutron pulse and means for deriving said apparent value representation from said neutron population measurement; and
said combining means comprises means for controlling the timing of the measurement period following a subsequent neutron pulse as a function of said apparent value representation and means for measuring the neutron population in the formation at said second location during said controlled measurement period.

31. The apparatus of claim 30 wherein:
the means for measuring the neutron population at the first location comprises means for measuring the neutron population during each of first and second time intervals within the measurement period following said neutron pulse;
the means for deriving said apparent value representation corresponding to the neutron population measurement at the first location comprises means for forming the ratio of the neutron population measurements during the first and second time intervals and for determining the timings of the first and second intervals required to maintain the neutron population ratio substantially at a predetermined number, the duration thus determined of at least one of the first and second intervals providing a representation of an apparent value of said selected neutron characteristic;
the means for controlling the timing of the measurement period following a subsequent neutron pulse comprises means for equating the timings of first and second time intervals within said subsequent measurement period to those required to maintain said neutron populations ratio substantially at said predetermined number;
the means for measuring the neutron population at the second location comprises means for measuring the neutron population during each of the first and second intervals of said subsequent measurement period; and
the means for deriving a representation functionally related to a quotient of said apparent values comprises means for forming the ratio of the neutron population measurements at the second location during the first and second time intervals of said subsequent measurement period.

32. The apparatus of claim 31 further comprising means for correcting said first location apparent value representation by a function of said ratio of the neutron population measurements at the second location to provide a corrected representation of the intrinsic value of said selected neutron characteristic.

33. The apparatus of claim 31 further comprising means for combining a function of said first location apparent value representation and a function of said ratio of the neutron population measurements at the second location to provide a representation of the apparent value of said selected neutron characteristic corresponding to the neutron population measurement at the second location.

34. The apparatus of claim 33 wherein the means for measuring the neutron populations at the first and second locations comprise first and second radiation detectors, respectively, the first detector being spaced closer to the neutron source than is the second detector.

35. Apparatus for providing verifiably accurate logging data derived at least in part by neutron logging of earth formations, comprising:
 a source for irradiating an earth formation with discrete pulses of high-energy neutrons, the decay of which is functionally related to intrinsic neutron characteristics of the formation;
 means for detecting indications of the neutron population in the formation between neutron pulses at a first location spaced from the neutron source;
 means for deriving a representation of an apparent value of a selected one of said neutron characteristics corresponding to the detected indications at the first location;
 means for detecting indications of the neutron population in the formation between neutron pulses at a second location spaced from the first location and from the neutron source;
 means for combining said first location apparent value representation and a function of said second location detected indications to derive a representation functionally related to the quality of said first location apparent value representation as a measurement of the intrinsic value of said selected neutron characteristic; and
 means for combining said first location apparent value representation and said quality representation to derive a representation of an apparent value of said selected neutron characteristic corresponding to the detected indications at said second location, thereby to provide a more accurate measurement of the intrinsic value of said selected neutron characteristic.

36. The apparatus of claim 35 wherein said selected neutron characteristic is a thermal neutron absorption characteristic of the formation.

37. The apparatus of claim 35 further comprising means for recording one or more of said first location apparent value representation, said quality representation, and said second location apparent value representation as a function of depth.

38. The apparatus of claim 35 wherein:
 the first location apparent value representation deriving means comprises means for measuring the neutron population in the formation at said first location in response to first location detected indications occurring during a variable measurement period following a neutron pulse and means for deriving said apparent value representation from said neutron population measurement; and
 said means for combining said first location apparent value representation and a function of said second location detected indications comprises means for controlling the timing of the measurement period following a subsequent neutron pulse as a function of said first location apparent value represenation and means for measuring the neutron population in the formation at said second location in response to second location detected indications occurring during said controlled measurement period.

39. A method for deriving a verifiably accurate measurement of an intrinsic neutron characteristic of an earth formation traversed by a borehole from detected indications of the neutron populations in the formation at first and second spaced locations along the borehole following irradiation of the formation with pulses of neutrons, comprising the steps of:
 deriving a representation of an apparent value of said neutron characteristic corresponding to said first location detected indications; and
 combining said first location apparent value representation and a function of said second location detected indications to derive a representation functionally related to a quotient of the apparent values of said neutron characteristic corresponding to the detected indications at the first and second locations, thereby to provide information as to the validity of said first location apparent value representation as a measurement of the intrinsic value of said neutron characteristic.

40. The method of claim 39 wherein said combining step comprises:
 deriving a representation of an apparent value of said neutron characteristic corresponding to said second location detected indications; and
 forming a ratio of the first and second location apparent value representations.

41. The method of claim 39 wherein:
 said first location apparent value representation deriving step comprises measuring the neutron population in the formation at said first location in response to first location detected indications occurring during a measurement period following a neutron pulse and deriving said apparent value representation from said neutron population measurement; and
 said combining step comprises controlling the timing of the measurement period following a subsequent neutron pulse as a function of said apparent value representation and measuring the neutron population in the formation at said second location in response to second location detected indications occurring during said controlled measurement period.

42. The method of claim 39 further comprising combining said first location apparent value representation and said quotient-related representation to provide a representation of an apparent value of said neutron characteristic corresponding to said second location detected indications.

43. A method for providing a measurement of an intrinsic neutron characteristic of an earth formation traversed by a borehole from detected indications of the neutron populations in the formation at first and second spaced locations along the borehole following irradiation of the formation with pulses of neutrons, comprising the steps of:
 deriving neutron population measurements from first location detected indications occurring during a measurement period between neutron pulses;

deriving a representation of an apparent value of said neutron characteristic corresponding to said first location neutron population measurements;

deriving neutron population measurements from second location detected indications occurring during a measurement period between neutron pulses;

combining said first location apparent value representation and a function of said second location neutron population measurements to derive a representation related to a function of the apparent values of said neutron characteristic corresponding to said first and second neutron population measurements; and combining said first location apparent value representation and said representation related to a function of the first and second apparent values to derive a representation of an apparent value of said neutron characteristic corresponding to the second location neutron population measurements.

44. The method of claim 43 wherein said neutron characteristic is a thermal neutron absorption characteristic of the formation.

45. The method of claim 43 wherein:

the step of deriving said first location apparent value representation comprises controlling the timing of first and second detection intervals within the measurement period as a function of said apparent value representation;

the step of combining said first location apparent value representation and a function of said second location neutron population measurements comprises controlling the measuring of the neutron population at the second location so as to provide a measurement of the neutron population at said second location during each of said first and second detection intervals; and the function of said second location neutron population measurements combined with said first location apparent value representation is a function of the ratio of the first and second detection interval neutron population measurements at the second location.

46. The method of claim 45 wherein the representation derived by combining said first location apparent value representation and said ratio function of the second location neutron population measurements is related to the ratio of the apparent values of said selected neutron characteristic corresponding to the neutron population measurements at said first and second locations.

47. A method for providing a verifiably accurate measurement of an intrinsic neutron characteristic of an earth formation traversed by a borehole from detected indications of the neutron populations in the formation at first and second spaced locations along the borehole following irradiation of the formation with pulses of neutrons, comprising the steps of:

deriving a representation of an apparent value of said neutron characteristic corresponding to said first location detected indications;

combining said first location apparent value representation and a function of said second location detected indications to derive a representation functionally related to the quality of said first location apparent value representation as a measurement of the intrinsic value of said neutron characteristic; and combining said first location apparent value representation and said quality representation to derive a representation of an apparent value of said neutron characteristic corresponding to the detected indications at said second location, thereby to provide a more accurate measurement of the intrinsic value of said selected neutron characteristic.

* * * * *